Nov. 27, 1923.
H. HILFERINK
AIR STANDARD
Filed Sept. 6, 1921
1,475,397
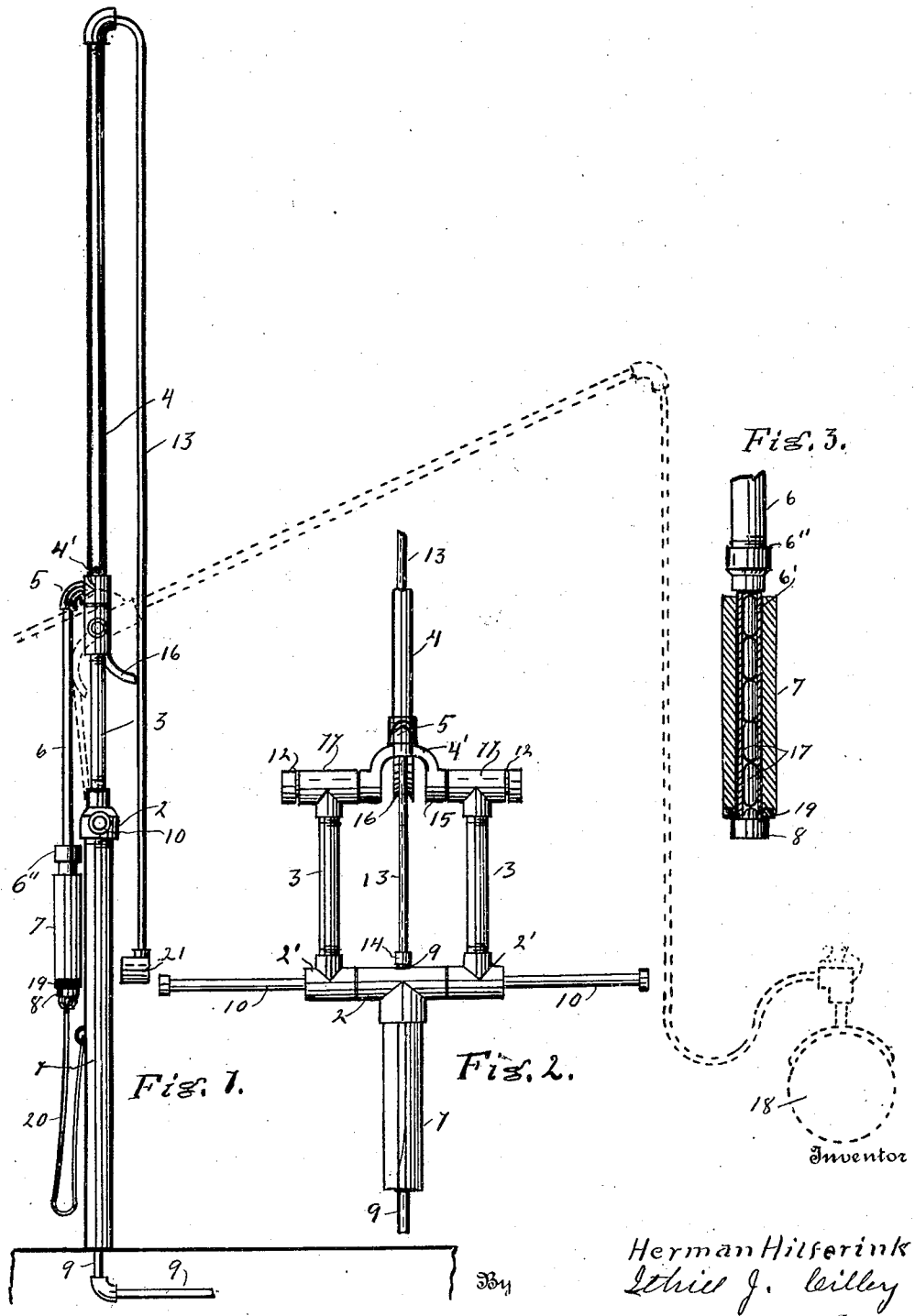
Inventor
Herman Hilferink Patented Nov. 27, 1923.

1,475,397

UNITED STATES PATENT OFFICE.

HERMAN HILFERINK, OF GRAND RAPIDS, MICHIGAN.

AIR STANDARD.

Application filed September 6, 1921. Serial No. 498,852.

*To all whom it may concern:*

Be it known that I, HERMAN HILFERINK, a citizen of the United States, residing at Grand Rapids, in the county of Kent and State of Michigan, have invented certain new and useful Improvements in Air Standards, of which the following is a specification.

My invention relates to improvements in implements for conducting and forcing air, under high pressure, into automobile tires, and other places where desired, and its objects are: first, to provide a means whereby the danger of forming short kinks, and of breaking the transmission tube when carrying the tower or adjustable supporting arm into positions for conveniently reaching the objective point, as the valve stem of an automobile tire may be obviated; second, to provide a means whereby the connection between the flexible conductor tube and the rigid conductor pipe may be readily and conveniently made, and will be conveniently accessible for connecting, disconnecting or repairing purposes; third, to provide a means whereby the rigid supporting arm or tower may be readily adjusted into positions for conveniently connecting the connecting end of the flexible tube with the object to be filled with air, and, fourth, to provide a means whereby the poise of the supporting arm or tower may be minutely adjusted.

I attain these objects by the mechanism and construction of parts shown in the accompanying drawing, in which Fig. 1 is a side elevation of my device, complete, Fig. 2 is a rear elevation of the upper end of the supporting standard, and of the adjustable parts of the device, and, Fig. 3 is a sectional elevation of the balancing weight showing the manner of readily adjusting the same to properly balance the adjustable arm.

Similar reference characters indicate similar parts throughout the several views.

In the construction of this implement I make use of a permanent standard 1 which is rigidly supported upon any available form of foundation, as indicated. At the upper end of this standard I mount a cross head, or T-shaped cap 2 in such a manner that it may be readily made to revolve upon the standard. At each end of this T-formed head I securely connect other T-shaped heads 2' and into these I mount the standards 3, and at the upper ends of these standards I securely mount a second pair of T-shaped heads 11 which form bearings for the free revoluble movement of the shafts 12, which latter are mounted in the hubs 15 of the yoke 4', so this yoke may be swung over to one side, as indicated by the dotted outlines shown in Fig. 1. The standard 1 has, encased within it, a service pipe 9, which may be made of ordinary gas pipe, which is connected, at one end, with a proper compressed air reservoir, not here shown, and at the other end with the flexible tube 13, as at 14, in such a manner that this connecting point is easily accessible for disconnecting, reconnecting or repairing the flexible tube, as desired.

For properly supporting the flexible tube 13, and to facilitate its movement to bring it into positions for use, and to automatically carry it back into normal position, I mount a hollow arm, as a half inch gas pipe, represented at 4, upon the yoke 4'. My device for returning the arm 4 into normal position consists of a second arm, 6, mounted upon the connecting element between the arm 4 and the yoke 4', as at 5, upon the free end of which I mount a weight 7, held in place by the head 8, or other available device. I prefer that the pipe 6 be made larger than the pipe 6' that passes through the weight, and is connected with the pipe 6 by means of the coupling 6''; and provide for properly adjusting the weight 7 with the arm 4 by placing more or less of the auxiliary weights 17 therein, as may be found necessary. 19 is a pliable washer, as of india rubber, between the end of the weight 7 and the head 8.

It is apparent that with but a short space between the end of the pipe 9 and the lower end of the arm 4, with no protecting element at the point of curvature of the pipe 13 the latter would soon be broken at the bending point. To obviate this difficulty I place a curved arm 16 upon the yoke 4' in such a position that it provides a long bend for the tube 13, and its extreme surface is grooved to receive and carry the flexible tube always in direct alinement with the vertical position of the pipe 9, thus insuring a long, easy bend when the arm 4 is drawn over for use.

10 represents arms for hanging signs. &c., and for other conveniences as they may appear.

Without proper preventative means the upper end of the arm 4 is likely to be drawn downwardly so rapidly and so far as to endanger marring or, perhaps, breaking through the top of an automobile when the tires are about to be inflated, and to obviate this I have provided a flexible retaining cord or chain 20, as may be desired, secured at one end to the end of the cap 8, and at the other end to the side of the standard 1, as indicated, of a proper length to allow the arm 4 to be carried over to, practically, the position indicated by its dotted lines in Fig. 1, but no further.

18 represents the outline of a tire to be inflated, and 21 represents the air valve at the end of the tube 13 for connecting said tube with the valve stem on the automobile tire, as indicated by the dotted outlines at the extreme right of Fig. 1.

Having thus fully described my invention, what I claim as new in the art, is:

1. In an air standard, a cylindrical supporting standard, a cap revolubly mounted upon said supporting standard, supporting arms mounted in said cap and positioned at right angles in a direct line from opposite sides thereof, a standard secured to, and extending upwardly from the outer end of each of said arms, a yoke pivotally mounted upon the upper ends of said standards, a tubular arm connected with, and extending relatively upward from said yoke, a cylindrical balancing weight connected with said tubular arm to hold it in normal position, a flexible air tube connected at one end with an air supply tank, extending through the supporting standard and the tubular arm and having an air valve connected with its free end.

2. In combination with the elements covered in claim 1, removable balancing weights mounted within the cylindrical weight.

3. In combination with the elements covered in claim 1, a curved arm mounted upon the yoke that carries the tubular arm and in position to modify the bending of the flexible air tube when the arm is carried over for connecting the air valve with a tire valve.

Signed at Grand Rapids, Michigan, September 1st, 1921.

HERMAN HILFERINK.